(12) United States Patent  (10) Patent No.: US 8,430,455 B2
Douceau et al.  (45) Date of Patent: Apr. 30, 2013

(54) DEVICE FOR MAINTAINING THE HINGE OF AN INCLINABLE SEAT OF A VEHICLE IN AN UNLOCKED POSITION

(75) Inventors: Daniel Douceau, Garancieres (FR); Vincent Hazera, Montigny le Bretonneux (FR)

(73) Assignee: Renault S.A.S., Boulogne-Billancourt (FR)

( * ) Notice: Subject to any disclaimer, the term of this patent is extended or adjusted under 35 U.S.C. 154(b) by 381 days.

(21) Appl. No.: 12/678,650

(22) PCT Filed: May 29, 2008

(86) PCT No.: PCT/FR2008/050942
§ 371 (c)(1),
(2), (4) Date: May 18, 2010

(87) PCT Pub. No.: WO2009/037404
PCT Pub. Date: Mar. 26, 2009

(65) Prior Publication Data
US 2010/0236024 A1   Sep. 23, 2010

(30) Foreign Application Priority Data
Sep. 17, 2007   (FR) ...................................... 07 06514

(51) Int. Cl.
*B60N 2/20* (2006.01)
(52) U.S. Cl.
USPC ................................ 297/378.14; 297/378.12
(58) Field of Classification Search .............. 297/367 R, 297/378.12, 378.14
See application file for complete search history.

(56) References Cited

U.S. PATENT DOCUMENTS

| 4,770,464 | A | 9/1988 | Pipon et al. | |
|---|---|---|---|---|
| 5,161,856 | A | 11/1992 | Nishino | |
| 5,779,313 | A | 7/1998 | Rohee | |
| 6,601,921 | B1 * | 8/2003 | Collins | 297/378.12 |
| 6,799,801 | B2 * | 10/2004 | Niimi et al. | 297/378.12 |
| 6,857,703 | B2 * | 2/2005 | Bonk | 297/378.14 |
| 6,910,739 | B2 * | 6/2005 | Grable et al. | 297/378.12 |
| 7,025,422 | B2 * | 4/2006 | Fast | 297/378.14 |
| 7,086,698 | B2 * | 8/2006 | Shiraki | 297/367 R |
| 7,300,109 | B2 * | 11/2007 | Hofmann et al. | 297/362 |
| 7,380,885 | B2 * | 6/2008 | Fischer et al. | 297/378.12 |
| 7,690,728 | B2 * | 4/2010 | Miyauchi et al. | 297/378.12 |
| 2002/0135215 | A1 | 9/2002 | Magyar et al. | |
| 2002/0180251 | A1 * | 12/2002 | Pospeshil et al. | 297/378.14 |
| 2004/0021355 | A1 * | 2/2004 | Ohba | 297/341 |
| 2004/0036339 | A1 * | 2/2004 | Christoffel et al. | 297/367 |
| 2004/0113478 | A1 | 6/2004 | Tame | |

FOREIGN PATENT DOCUMENTS

| DE | 10 2005 043 941 | 4/2007 |
|---|---|---|
| EP | 0 770 514 | 5/1997 |
| FR | 2 599 684 | 12/1987 |
| FR | 2 659 604 | 9/1991 |

* cited by examiner

*Primary Examiner* — Peter R. Brown
(74) *Attorney, Agent, or Firm* — Oblon, Spivak, McClelland, Maier & Neustadt, L.L.P.

(57) ABSTRACT

A device for maintaining a hinge of a seat in an unlocked position, that includes a locking mechanism that can be declutched by rotation of an axis of the hinge, and a cam connected to a back of the seat and having a profile adapted to act on a forced-rotation driving mechanism of the hinge axis from a first inclination angle of the back of the seat towards the front, and to stop acting on the driving mechanism from a second inclination angle towards the front.

8 Claims, 4 Drawing Sheets

DEVICE FOR MAINTAINING THE HINGE OF AN INCLINABLE SEAT OF A VEHICLE IN AN UNLOCKED POSITION

BACKGROUND

The present invention relates to a motor vehicle seat, the backrest of which is hinged to the seat cushion, it being possible to adjust and lock the inclination of the backrest in particular angular ranges with respect to the seat cushion by virtue of a special mechanism commonly known as a "hinge".

The general principle of a seat hinge has been known for a long time, for example from the documents FR 2 599 684 or EP 0 770 514. It is based on the meshing, with a toothed ring, of three sprags at an angular spacing of 120°, it being possible to disengage this meshing by virtue of a hinge pin actuated by a handle. In the disengaged position, the sprags approach the center of the hinge and no longer mesh in the toothed ring.

As an adjustable inclination is only useful in an angular range which is more limited than 120°, and since it is furthermore expedient not to be able to lock the seat outside this angular range, it is known, for example from the document FR 2 659 604, to provide sectors on the toothed ring of the hinge which are not cogged and thus where the sprags cannot mesh. For example, it is known practice to divide each 120° sector of the toothed ring into a cogged 75° sector and a smooth 45° sector. The upper cogged sector is split on either side of the vertical, for example between 65° toward the rear and 10° toward the front; this cogged sector is thus followed toward the front by the smooth 45° sector which is itself followed, at an inclination of 35° to the horizontal, by the start of the next cogged sector.

In some vehicles it is desirable to be able to retract the seat by moving the backrest in folded-flat form toward the front, horizontally. The user in this case has to maneuver the handle of the hinge pin and simultaneously pivot the backrest forward; once the inclination of the latter causes it to enter the sectors of the hinge which are not cogged, that is to say between 10° and 55° beyond the vertical, the user can release the handle since it is no longer possible to lock the seat. However, this locking becomes possible again (beyond 55° in the example given) before reaching the horizontal, such that the user must actuate the maneuvering handle again in the last part of the folding-flat operation in order to prevent the seat from locking before it reaches the retracted position. Moreover, it is difficult for the user to estimate this horizontal position exactly, such that the backrest may in the end be immobilized in a position which is not the absolutely ideal position.

BRIEF SUMMARY

The aim of the invention is to remedy this difficulty and to enable the user to release the maneuvering handle again when he is retracting the backrest, at least through the whole of the final part of the maneuver and to enable locking exactly in the position desired for retracting, in principle the horizontal position.

This aim is achieved according to the invention by virtue of a device for keeping a seat hinge unlocked, comprising a locking mechanism that can be disengaged by the rotation of a hinge pin, characterized in that the device comprises a cam connected to the backrest, the profile of which is intended to act on means for forced rotation of the hinge pin forward of a first inclination angle of the backrest, and is intended to stop acting on said rotation means forward of a second inclination angle. Thus, the user can release the maneuvering handle again as soon as it has passed the first angle and the backrest will incline without locking as far as the second angle.

The first angle can be chosen to be less than or equal to 10°, or else it can be chosen to have any value equal to or greater than the start of the sector of the hinge which is not cogged (but less than the start of the next cogged sector).

The second angle is advantageously chosen to be equal to 90° for precise retraction horizontally. In this manner, the backrest is positioned directly at the end of forward travel in the ideal retracted position without the user having to take hold of the maneuvering handle again.

The device of the invention and the forced rotation means are outside the hinge such that a conventional hinge can be used and the means of the invention can be adapted thereto.

According to one embodiment, the forced rotation means comprise a set of link rods, the end of one of which is connected in rotation to the hinge pin and the end of the other of which is connected to a member moved by the cam of the device.

The member moved by the cam advantageously travels in a guide slot. The latter is formed in the wall of a guide piece attached to the seat; this wall may be located at a slight distance from the surface of application to the seat in order for the set of link rods to be housed between it and the seat.

The guide piece may have a surface which swivels in a piece attached to the backrest and covers the guide piece close to the hinge pin. This piece advantageously forms said cam at a tab.

BRIEF DESCRIPTION OF THE DRAWINGS

Further features and advantages of the invention will become apparent from the following description of an exemplary embodiment. Reference will be made to the attached drawings, in which.

DETAILED DESCRIPTION

Figure 1:
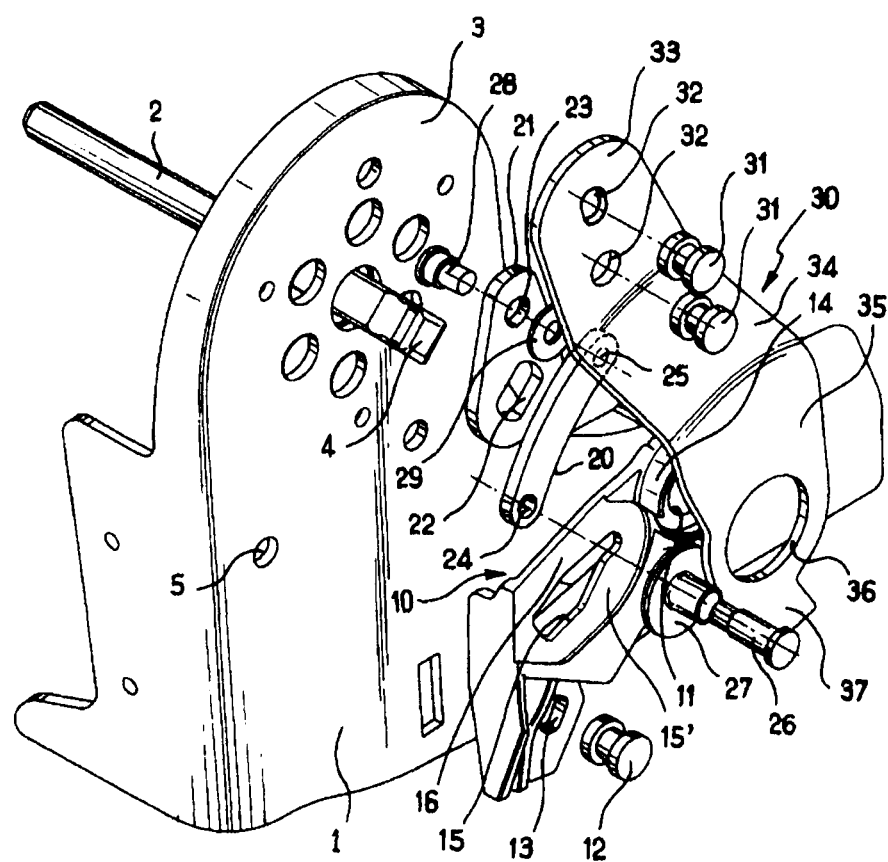
FIG. 1 is an exploded perspective view of one embodiment of the invention.

In a manner known per se, in particular from the documents cited at the beginning of this description, the hinge between the backrest and the seat cushion is obtained by means of a hinge mechanism consisting of two round plates able to rotate with respect to one another, one of the plates being attached to a fitting connected to the seat cushion and known as the seat side member 1, and the other plate being attached to a fitting 6 connected to the backrest. The relative rotation of the two plates is normally prevented by a locking system consisting of serrated radial sprags borne by one of the plates and pressing radially against a toothed ring formed in a circular shoulder borne by the other plate and provided with cogged sectors and sectors which are not cogged. The radial sprags may be disengaged simultaneously from their meshing with the circular shoulder by actuating a mechanism controlled by a hinge pin 2 bearing a maneuvering handle (or connected to actuating means). The maneuvering of the hinge pin 2 therefore allows one of the two plates to be pivoted with respect to the other and thus inclines the backrest of the seat to a greater or lesser degree with respect to the seat cushion, and releasing the hinge pin again causes the sprags to mesh once again in the circular shoulder and sets a new position of the backrest unless the sprags are then opposite a part which is not cogged, in which case the backrest inclines further until the sprags are once again in front of a cogged part, the arrival and blocking position moreover being approximate.

The device of the invention aims, as the backrest is inclined into particular positions, to exert positive action automatically on the hinge pin in order to prevent locking in position.

The device of the invention fits on the side member 1 which is in the form of an L with a horizontal leg intended for fastening to the seat cushion (not shown) and a vertical leg, the rounded upper part 3 of which, having a rim, houses the hinge mechanism of known type which is approximately in the form of a disk. Holes enable said mechanism to be fastened securely. The hinge pin or rod 2 passes through the side member 3 in order to form a terminal part 4 having a noncircular (for example square) cross section in order to be able to have an element for maneuvering the hinge pin 2 fitted onto it.

A guide piece 10 is fastened to the outer surface of the vertical leg of the side member 1, being held on the one hand by holding means 36, which will be described hereinbelow and hold the piece 10 around the end piece protruding from the pin 2 which penetrates into an opening 11 in the guide piece, and on the other hand by an assembly rivet 12 passing into the holes 5 and 13 of the side member 1 and of the guide piece 10. Around the opening 11, a circular rib 14 is formed in order to receive in rotation a cam member 30 described hereinbelow. Finally, the guide piece 10 has in its middle a guide slot 15 in the form of a pistol, the point of which points toward the opening 11. The slot 15, surrounded by an area 15', is formed in a wall 16 of the guide piece 10 which is offset toward the front with respect to the wall in which the fastening hole 13 is made, such that when the guide piece 10 is fastened on the side member 1 there is enough room behind the wall 16 for other flat members of the mechanism of the invention to be housed and moved, namely a rear link rod 20 and a front link rod 21. The front link rod 21 is a simple short arm having toward one end a slot 22 intended to engage with play with the end piece 4 of the hinge pin 2 so as to be fixed in rotation therewith, and having a hole 23 toward the other end. The rear link rod 20 is circularly arcuate and has holes 24 and 25 at its ends. A holding rivet 26 passes through the slot 15 in the guide piece 10 and is fastened behind the hole 24 in the link rod 20; the rivet 26 is held protruding from the front of the slot 15 by virtue of a friction ring 27 which rubs against the area 15' surrounding the slot 15. A rivet 28 and a washer 29 assemble the link rod 20 and the link rod 21 in the manner of a hinge through their respective holes 25 and 23.

A cam piece 30 is secured to the fitting 6 of the seat backrest by virtue of assembly rivets 31 and holes 32 in the cam 30. The piece 30 has a flat form folded in the form of a Z so as to form a part 33 in contact with the fitting 6 of the backrest located at a different level from the opposite parallel part 35, these two parts 33 and 35 which are parallel to the fitting 6 being separated by a perpendicular part 34. The part 35 covers the guide member 10 and holds it in position by virtue of the engagement of the circular rib 14 and an orifice 36 into which it is introduced with play. The part 35 has a cam tab 37 defining a cam profile intended to engage with the holding rivet 26 located in the slot 15 in the guide member. The form and function of this cam page will become apparent from the explanations which will be given in connection with FIGS. 2 to 5.

Figure 2:
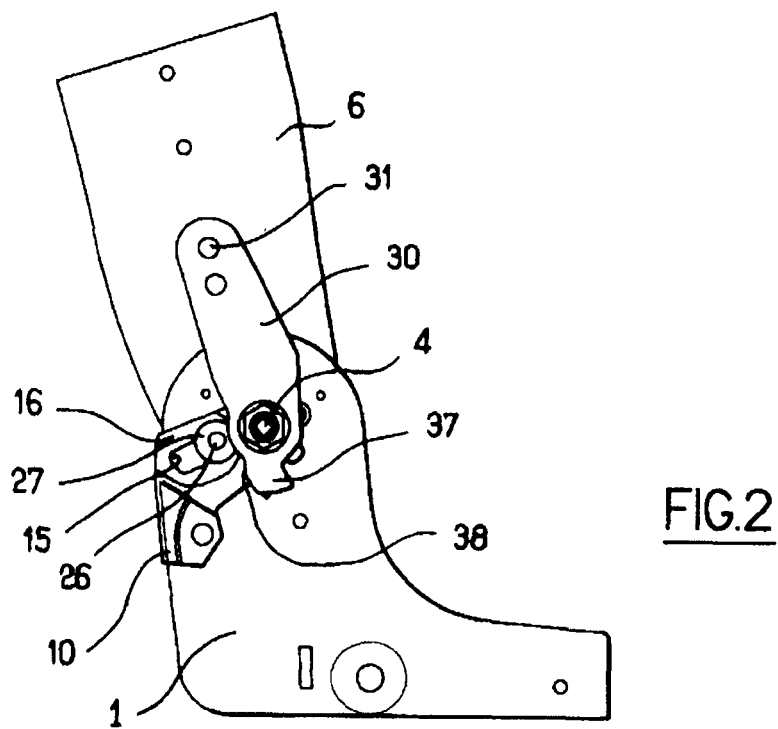
FIGS. 2 to 5 are four side views close to the hinge of side members of an inclinable seat equipped with the device of FIG. 1, FIGS. 2 to 5 corresponding to four stages of inclination.

FIG. 2 shows the seat in the comfort position, as shown by the slight rearward inclination (25°) of the backrest fitting 6 with respect to the seat side member 1. In this position, the cam tab 37 points downward and does not interfere with the holding rivet 26 located at the right-hand end of the slot 15 in the guide piece 10.

Figure 3:
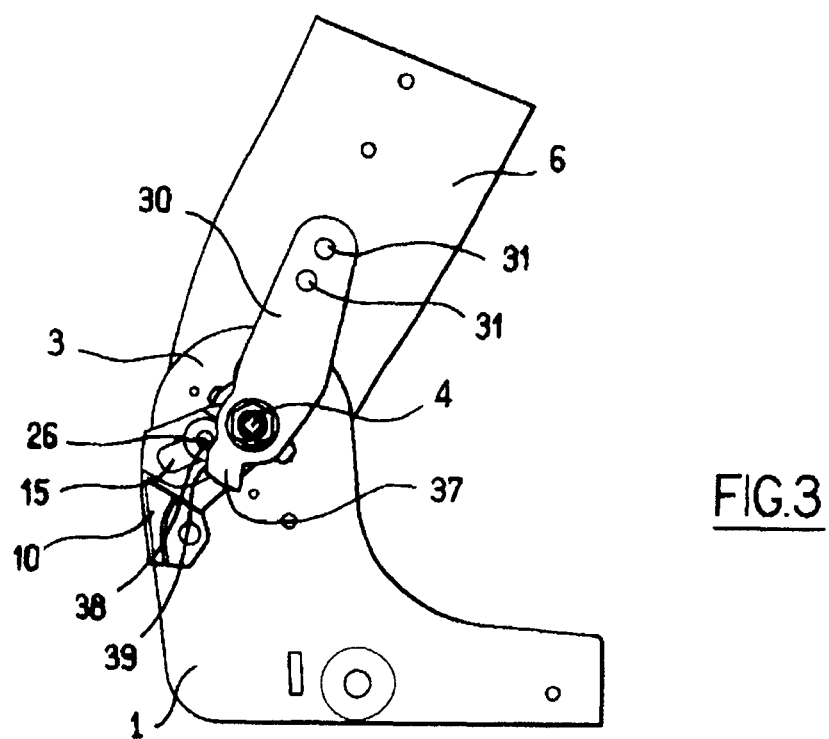

In FIG. 3, the seat is in the end locking position toward the front, with the fitting 6 inclined forward (for example 10°). The holding rivet 26 is housed in a hollow 38 in the left-hand profile of the cam tab 37, just before reaching a ramp 39 which runs away from the pin 4 in the piece 30. In order to reach this ramp, the hinge mechanism must first be maneuvered by the rod 4, the effect of which is to send the holding rivet 26, by means of the set of link rods 20, 21, to the opposite end of the slot 15, to the left, as shown in FIG. 4, and to make it possible to rotate the seat.

Figure 4:
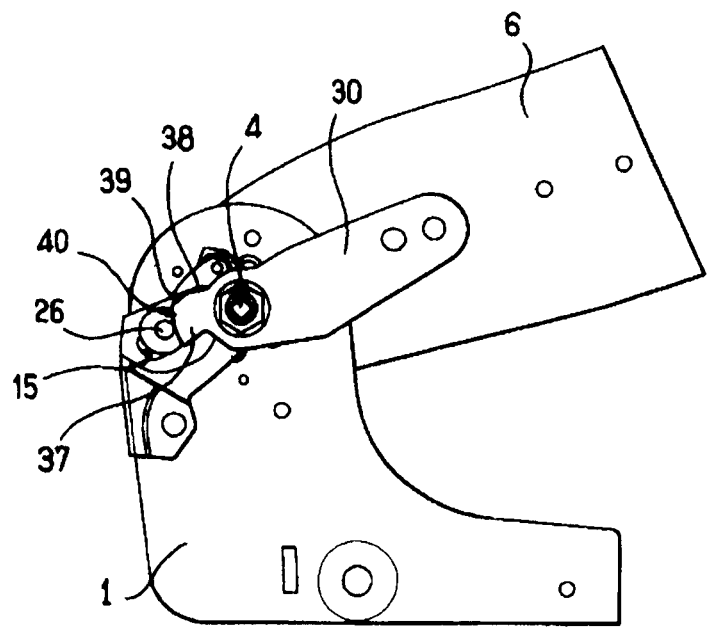
Figure 5:
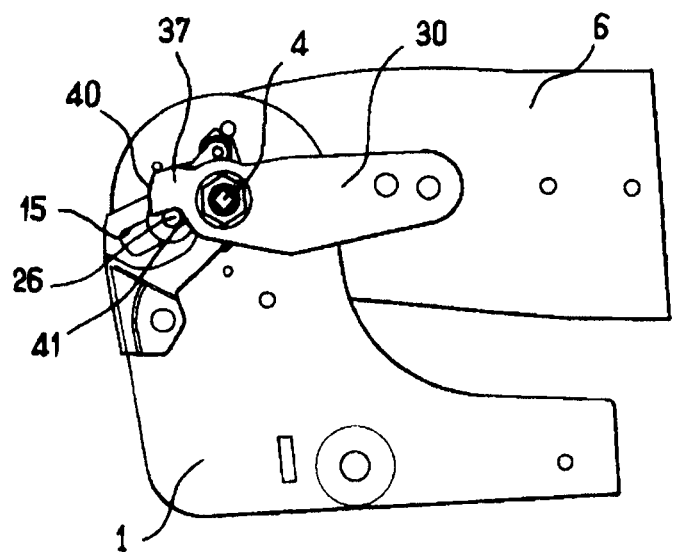

When the mechanism is unlocked, the seat can be hinged down further forward as is shown in FIG. 4; in this way, a circular part 40 of the cam tab 37 follows the ramp 39 and holds the rivet 26 in the left-hand position in the slot 15, that is to say in the unlocked position of the hinge, even if the sprags of the latter are in front of a cogged sector of the hinge. The sprags do not mesh since the mechanism is unlocked and the seat is not blocked in this position but may follow its path as far as the position shown in FIG. 5 where the seat is horizontal.

In this position, the cam tab 37 suddenly offers a hollow profile 41 to the rivet 26 which, as it leaves the flat part 40, then falls into this hollow profile and passes back to the right-hand end of the slot 15 under the effect of the elasticity of the hinge mechanism, and thus relocks the hinge mechanism. The sprags can then mesh with the toothed sector opposite them and the seat is locked in this folded-flat position, exactly horizontally.

In order to return the seat to the right-hand position, all that is necessary is to maneuver the rod 4 in order to unlock the mechanism and, with the maneuvering of the rod 4 having pushed by way of the link rods 20, 21 the holding rivet toward the left, to freely straighten up the seat.

Figure 6:
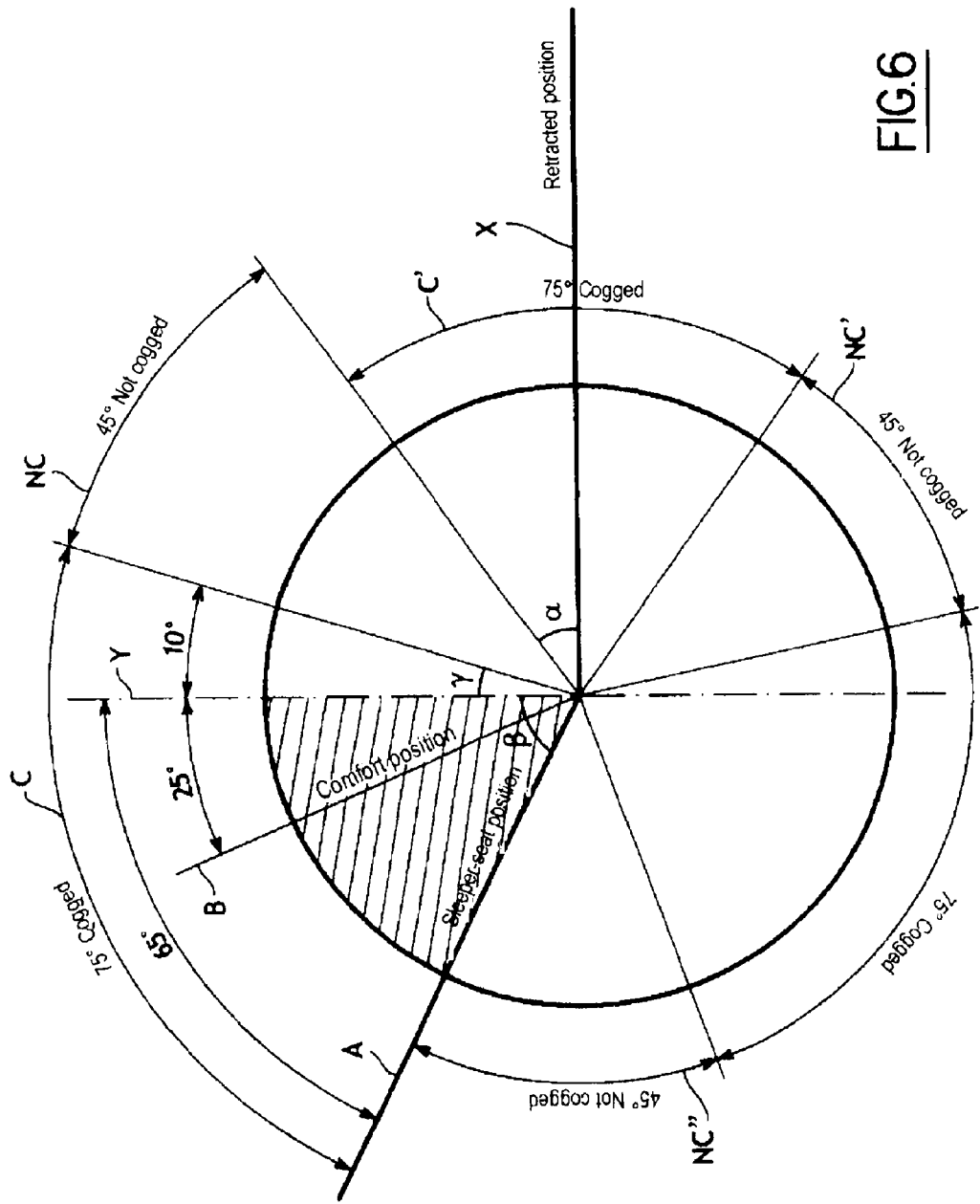
FIG. 6 is a schematic view of the hinge angles provided according to the invention.

FIG. 6 summarizes the possibilities of seat inclination and locking in position according to the invention. The sleeper-seat position of the seat at an inclination of 65° rearward with respect to the vertical axis Y (maximum inclination limited by a mechanical stop) can be seen at A, the so-called comfort position at 25° toward the rear can be seen at B, and the retracted or hinged-flat position toward the front can be seen at X, coincident with the horizontal axis.

Moreover, the hinge mechanism used, known per se, has three 120° sectors engaging with three sprags, each 120° sector being divided into a cogged sector C, C', C" of 75° and a sector NC, NC', NC" which is not cogged and makes up the remaining 45°.

The user adjusts the position of the seat in the angular zone "beta". If he wishes to retract the seat backrest to position X, he must maneuver the hinge mechanism, which unmeshes the sprags from the cogged sectors C, C' and C". However, having passed through the 10° of angular zone "gamma" toward the front, he can release the maneuvering handle again since, in the following 45°, the sprags will be in front of sectors NC, NC', NC" which are not cogged, and, starting from the terminal zone "alpha" of 35°, the device of the invention will force the maneuvering rod, by virtue of the cam 37, into the unlocked position, preventing the sprags meshing until the position X has actually been reached, and the cam profile 41 returns the maneuvering rod 4 into the locked position with the sprags thus meshed with the cogged zone.

It goes without saying that other angular configurations can be chosen to define the cogged sectors and the sectors which are not cogged. Thus, if desired, the angular zone "gamma" of 10° toward the front, where the backrest can be locked, can be avoided, or by another cam mechanism or an appropriate cam profile which eclipses the locking in this zone or more simply by rotating the toothed ring of the hinge 10° toward the rear in order to move the cogged zones further away.

The invention claimed is:

1. A device for maintaining a seat hinge in an unlocked position, comprising:
    a seat side member attached to a seat cushion of a seat;
    a fitting attached to a backrest of the seat;
    a locking mechanism fixed to the seat side member and the fitting and including radial sprags and a toothed ring, the radial sprags and the toothed ring being configured in a locked position to prevent the fitting from rotating with respect to the seat side member;
    a hinge pin configured to be maneuvered via a handle to a first position to unlock the locking mechanism by separating the radial sprags from the toothed ring such that the fitting is rotatable with respect to the seat side member; and
    a cam connected to the seat side member, a profile of the cam is configured to move a rotation member connected to the hinge pin from a rest position to force rotation of the hinge pin to the first position when the backrest is positioned forward of a first inclination angle to separate the radial sprags from the toothed ring such that the fitting is rotatable with respect to the seat side member to a range of inclination angles greater than the first inclination angle, and the profile of the cam is configured to stop acting on the rotation member so that the rotation member returns to the rest position to maneuver the hinge pin to a second position when the backrest is positioned forward of a second inclination angle greater than the first inclination angle such that the radial sprags and the toothed ring are returned to the locked position to prevent the fitting from rotating with respect to the seat side member.

2. The device as claimed in claim 1, wherein the first angle is less than or equal to 10°.

3. The device as claimed in claim 1, wherein the second angle is equal to 90°.

4. The device as claimed in claim 1, wherein the cam and the rotation member are outside the seat side member and fitting.

5. The device as claimed in claim 1, wherein the rotation member comprises a rivet in contact with the profile of the cam and a set of link rods connecting the rivet and the hinge pin, and
    the set of link rods includes a first link rod and a second link rod, a first end of the first link rod is connected in rotation to the hinge pin and a second end is connected to a first end of the second link rod, a second end of the second link rod is connected to the rivet such that movement of the backrest forward of the first inclination angle causes the cam to move the rivet, and the movement of the rivet moves the second link rod which causes the first link rod to rotate the hinge pin.

6. The device as claimed in claim 5, further comprising:
    a guide piece attached to the seat side member and including a guide slot,
    wherein the rivet moved by the cam travels in the guide slot of the guide piece.

7. The device as claimed in claim 6, wherein the guide piece is positioned at a distance from a surface of the seat side member and the set of link rods are housed between the guide piece and the seat side member.

8. The device as claimed in claim 1, wherein the cam profile stops acting on the rotation member when the backrest is positioned forward of the second inclination angle because the cam profile includes a hollow portion such that the profile of the cam allows the rotation member to return to the rest position to maneuver the hinge pin to the second position.

* * * * *